United States Patent [19]
Leo

[11] 3,964,190
[45] June 22, 1976

[54] ADVERTISING DISPLAY DEVICE

[76] Inventor: Daniel W. Leo, 322 S. Merrick Ave., Merrick, N.Y. 11566

[22] Filed: May 30, 1975

[21] Appl. No.: 582,180

[52] U.S. Cl. ................................................ 40/39
[51] Int. Cl.² ........................................ G09F 11/02
[58] Field of Search............ 40/106.45, 128, 142 A, 40/39; 46/58, 242, 236; 308/10

[56] References Cited
UNITED STATES PATENTS

| | | | |
|---|---|---|---|
| 3,233,950 | 2/1966 | Baermann | 308/10 |
| 3,512,851 | 5/1970 | Love | 308/10 |
| 3,786,583 | 1/1974 | Revor | 46/58 |

Primary Examiner—Louis G. Mancene
Assistant Examiner—John H. Wolff

[57] ABSTRACT

An advertising display device characterized by a rotating cardboard cylinder in which rotation is propelled by air currents in the room impinging upon air vanes extending outwardly from the cylinder. The device includes a low-friction rotational supportive being created by opposing magnetic fields. The device consists of a segmented pole supported at a lower end thereof by a floor or other horizontal surface; disposed at the top of the upper section of the pole is a magnet with a protruding pin. In the center of the top wall of the cylinder is another magnet with a corresponding recess. The pin of the first magnet rests in the recess of the second, and the magnets face each other with like polarity, thus repelling each other. This creates a floating effect, allowing for low frictional rotation.

1 Claim, 5 Drawing Figures

U.S. Patent June 22, 1976 3,964,190
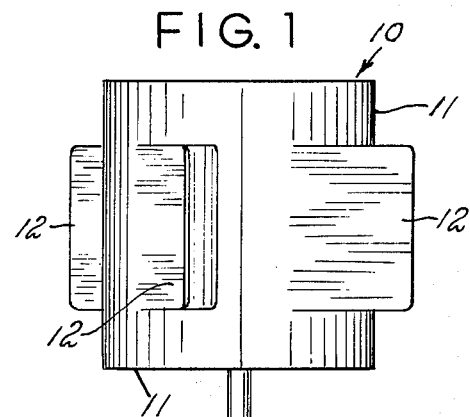
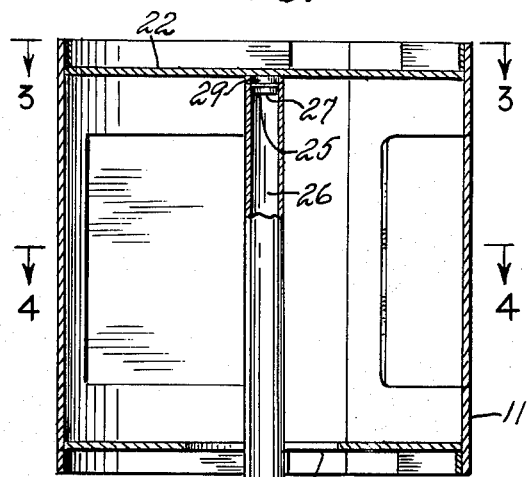
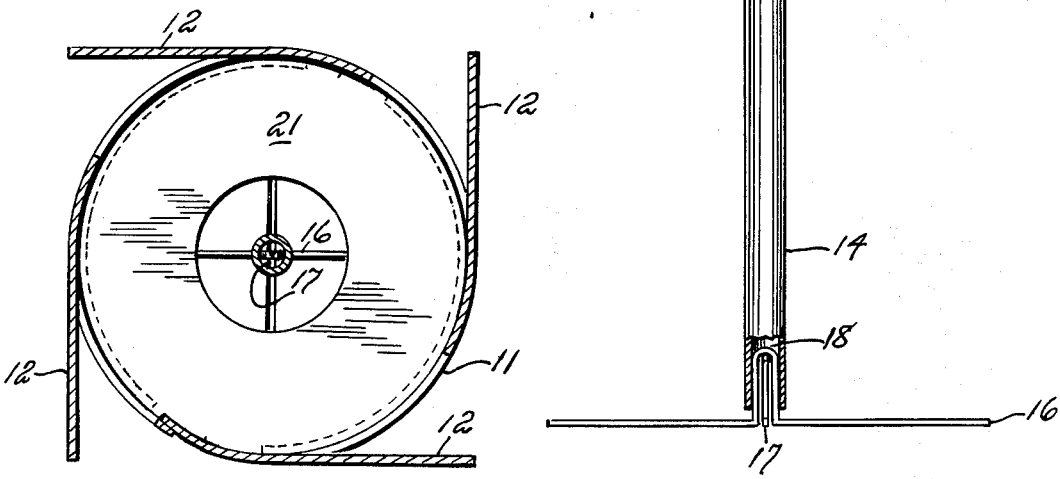

ADVERTISING DISPLAY DEVICE

BACKGROUND OF THE INVENTION

The concept of a rotating advertising display device is known in the art. Such devices are generally electrically powered, making them relatively expensive to manufacture, to operate, and to maintain. It is known to use air vanes to effect motion, yet this has only been possible where air currents strong enough to overcome friction are either naturally present or artificially created. It is also known to use magnetic fields to reduce friction.

SUMMARY OF THE INVENTION

Briefly stated, the invention contemplates the incorporation of opposing magnetic fields into a pin-type bearing of a rotating cylindrical cardboard advertising display device, thus reducing the friction of the bearing to a sufficiently low level that the air vanes cut out of the cylinder need only a minimal amount of air movement in order to effect rotation of the cylinder around a vertical pole supporting the cylinder. As a result, a rotating display device can be manufactured at a low cost and operated solely by the existing air currents in a room.

BRIEF DESCRIPTION OF THE DRAWING

In the drawing to which reference will be made in the specification, similar reference characters have been employed to designate corresponding parts throughout the several views.

FIG. 1 is a elevational view of an embodiment of the invention.

FIG. 2 is an enlarged elevational view of the embodiments, partly in section.

FIG. 3 is a top plan view of the embodiment.

FIG. 4 is a sectional view as seen from the plane 4—4 in FIG. 2.

FIG. 5 is an enlarged fragmental sectional view partly in elevation of an upper central part of FIG. 2.

DETAILED DESCRIPTION OF THE DISCLOSED EMBODIMENT

In accordance with the invention, the device, generally indicated by reference character 10, comprises broadly: a cardboard cylinder 11 with cut-out air vanes 12, a vertical pole 13 with lower portion 14 and upper portion 15, and a floor engaging device 16.

The floor engaging device 16 is of heavy wire construction as known in the art with an upwardly directed extension 17 onto which engages the hollow end 18 of the lower portion 14 of the vertical pole 13. The upper portion 15 of this pole rests on top of the lower portion 14 which has narrowed section 19 at its upper end. This section 19 slips into the hollow end 20 of upper portion 15 to be frictionally retained.

The cardboard cylinder 11 is of hollow configuration with circular walls 21 and 22 frictionally retained at each end of the cylinder. The wall 21 has a centrally disposed circular opening to allow the pole 13 to pass therethrough. The cylinder 11 is further characterized by air vanes 12. As best seen in FIG. 4, these vanes are cut-out tabs which extend outwardly from the outer surface of the cylinder. The vanes 12 lie in the path of ambient air currents which provide for the rotational movement of the cylinder around the vertical axis of pole 13 or point 24. The fact that vanes 12 extend tangentially from the surface allow them to be useful for advertising display purposes as well as for propulsion.

The cylinder 11 is supported on the pole 13 by means of pin bearing 25 as best illustrated in FIG. 5. In the hollow end 26 of upper portion 15 mounts a circular magnet 27 with a pin 28 protruding upwardly therefrom. Similarly, in the center of the lower surface of circular wall 22 of the cylinder 11 is another magnet 29 with a recess 30 facing the magnet 27. Pin 28 rests in a recess 30, thus engaging the vertical pole 13 with the cylinder 11. The magnet 27 faces magnet 29 such that the two similar poles are opposing each other. This creates a low-friction partially floating effect which allows for the easy rotation of cylinder 11.

Apart from floor base 16, the magnets 27 and 29, and the pin 28, the entire device can be constructed of relatively lightweight and inexpensive cardboard or similar material.

I wish it to be understood that I do not consider the invention limited to the precise details of structure shown and set forth in this specification, for obvious modification will occur to those skilled in the art to which the invention pertains.

I claim:

1. An advertising display device comprising: a relatively fixed support element including a vertically disposed pole having an upper end, a rotating element supported by said pole upon said upper end for rotation thereon about a vertical axis; said rotating elment including a cylindrical wall having an outer surface for the display of advertising indicia thereon, and an upper planar wall engaging an inner surface of said cylindrical wall; vein means extending from said cylindrical wall; said upper wall having a centrally disposed magnet thereon, and means concentrically disposed with respect to said magnet defining a conical recess; the upper end of said pole having a second coaxially disposed magnet thereon, and a pin coaxially disposed relative to said second magnet extending upwardly therefrom, whereby engagement of said pin within said recess serves to provide a self-centering supportive action; said first and second magnets being arranged to present adjacent surfaces of like polarity whereby the magnetic repelling action existing therebetween lessens the effective weight supported by said pin, and correspondingly reduces rotational friction of said rotating element.

* * * * *